(12) United States Patent  
Pepperell et al.

(10) Patent No.: US 7,532,231 B2  
(45) Date of Patent: May 12, 2009

(54) VIDEO CONFERENCE RECORDER

(75) Inventors: Andrew Pepperell, Twickenham (GB); David John Holloway, Ascot (GB)

(73) Assignee: Codian Limited, Slough (GB)

( * ) Notice: Subject to any disclaimer, the term of this patent is extended or adjusted under 35 U.S.C. 154(b) by 887 days.

(21) Appl. No.: 11/015,499

(22) Filed: Dec. 17, 2004

(65) Prior Publication Data

US 2006/0146124 A1 Jul. 6, 2006

(51) Int. Cl.
*H04N 7/14* (2006.01)
*G06F 3/00* (2006.01)

(52) U.S. Cl. .............. 348/14.08; 348/14.09; 348/14.01

(58) Field of Classification Search ... 348/14.01–14.16; 375/240.29; 345/748, 721, 728
See application file for complete search history.

(56) References Cited

U.S. PATENT DOCUMENTS

| | | | |
|---|---|---|---|
| 4,650,929 A | 3/1987 | Boerger et al. | |
| 4,882,747 A | 11/1989 | Williams | |
| 5,473,367 A | 12/1995 | Bales et al. | |
| 5,483,588 A | 1/1996 | Eaton et al. | |
| 5,495,522 A | 2/1996 | Allen et al. | |
| 5,600,646 A | 2/1997 | Polomski | |
| 5,640,195 A | 6/1997 | Chida et al. | |
| 5,771,273 A | 6/1998 | McAllister et al. | |
| 5,821,985 A | 10/1998 | Iizawa et al. | |
| 5,841,763 A | 11/1998 | Leondires et al. | |
| 5,867,653 A | 2/1999 | Aras et al. | |
| 5,872,922 A | 2/1999 | Hogan et al. | |
| 5,929,898 A | 7/1999 | Tanoi et al. | |
| 5,982,459 A | 11/1999 | Fandrianto et al. | |
| 6,025,870 A | 2/2000 | Hardy | |

(Continued)

FOREIGN PATENT DOCUMENTS

| | | |
|---|---|---|
| WO | WO-96/08911 A1 | 3/1996 |
| WO | WO-03/063484 | 7/2003 |

OTHER PUBLICATIONS

Addeo, E.J. et al. (Mar. 17, 1987). "A Multi-media Multi-point Communication Services Capability for Broadband Networks," International Switching Symposium 1987 Proceedings, Phoenix, AX, Mar. 15-20, 1987, pp. C5.5.1-C5.5.6.

(Continued)

*Primary Examiner*—Melur Ramakrishnaiah
(74) *Attorney, Agent, or Firm*—Oblon, Spivak, McClelland, Maier & Neustadt, P.C.

(57) ABSTRACT

A Video Conference Recorder (VCR) provided with integral input transcoders which convert received video call data into an intermediate format. Once the input transcoder has processed the data it passes it to a memory in the VCR where it is stored until a user requires it to be played back. If required the data can be converted into more than one output format using multiple input transcoders. On receiving a request to play back a recording the VCR locates the data in its memory and sends it to an output transcoder, integral to the VCR. If the stored data format is one that the endpoint can receive then the output transcoder transmits the data across the network to the endpoint. If, however, the endpoint cannot receive the stored data format then the output transcoder converts the data into a format which the endpoint can receive before onward transmission.

15 Claims, 3 Drawing Sheets

U.S. PATENT DOCUMENTS

| | | | |
|---|---|---|---|
| 6,128,649 | A | 10/2000 | Smith et al. |
| 6,215,515 | B1 | 4/2001 | Voois et al. |
| 6,366,771 | B1 | 4/2002 | Angle et al. |
| 6,370,113 | B1 | 4/2002 | Paradiso et al. |
| 6,445,472 | B1 | 9/2002 | Kim et al. |
| 6,496,216 | B2 | 12/2002 | Feder et al. |
| 6,574,469 | B1 | 6/2003 | Xiang et al. |
| 6,577,712 | B2 | 6/2003 | Larsson et al. |
| 6,584,076 | B1 | 6/2003 | Aravamudan et al. |
| 6,590,604 | B1 | 7/2003 | Tucker et al. |
| 6,614,465 | B2 | 9/2003 | Alexander et al. |
| 6,614,845 | B1 | 9/2003 | Azadegan |
| 6,633,324 | B2 | 10/2003 | Stephens, Jr. |
| 6,697,476 | B1 | 2/2004 | O'Malley et al. |
| 6,750,896 | B2 | 6/2004 | McClure |
| 6,757,005 | B1 | 6/2004 | Elbaz et al. |
| 6,760,749 | B1 | 7/2004 | Dunlap et al. |
| 6,771,779 | B1 | 8/2004 | Eriksson et al. |
| 6,810,035 | B1 | 10/2004 | Knuutila et al. |
| 6,978,001 | B1* | 12/2005 | Shaffer et al. ........... 379/202.01 |
| 6,985,530 | B1* | 1/2006 | Zerbe .................... 375/240.29 |
| 6,989,856 | B2 | 1/2006 | Firestone et al. |
| 7,113,200 | B2 | 9/2006 | Eshkoli et al. |
| 7,167,191 | B2* | 1/2007 | Hull et al. .................... 715/748 |
| 2002/0044201 | A1 | 4/2002 | Alexander et al. |
| 2004/0207724 | A1 | 10/2004 | Crouch et al. |
| 2005/0248652 | A1 | 11/2005 | Firestone et al. |
| 2006/0026002 | A1 | 2/2006 | Potekhin et al. |
| 2006/0077252 | A1 | 4/2006 | Bain et al. |
| 2006/0164507 | A1 | 7/2006 | Eshkoli et al. |
| 2006/0164508 | A1 | 7/2006 | Eshkoli et al. |

OTHER PUBLICATIONS

Bernard, J.D. (Jul. 14, 1999). "Streaming Services Manual: Installation and Operation," PictureTel Streaming Manual V1.0.8, 156 pages.

Boyer, D.G. et al. (Oct. 1994). "The Personal Presence System—A Wide Area Network Resource for the Real Time Composition of Multipoint Multimedia Communications," ACM Multimedia '94 Proceedings, San Francisco, CA, Oct. 15-20, 1994, pp. 453-460.

Compression Labs, Incorporated. (1993-1996). "Multipoint 2□: Multimedia Conference Server, Release 5.1 Administration Guide," 394 pages.

Gong, F. (1994). "Multipoint Audio and Video Control for Packet-based Multimedia Conferencing," ACM Multimedia '94 Proceedings, San Francisco, CA, Oct. 15-20, 1994, pp. 425-432.

Holfelder, W. (Oct. 1998). "Interactive Remote Recording and Playback of Multicast Videoconferences," *Computer Communications* 21 (15):1285-1294.

Horn, D.N. et al. (Jan./Feb. 1993). "A Standards-based Multimedia Conferencing Bridge," *AT&T Technical Journal* 72(1):41-49.

International Telecommunication Union. (Feb. 1998). "H.323: Packet-based Multimedia Communications Systems," 127 pages.

International Telecommunication Union. (Nov. 2000). "H.323 Annex M.1: Tunnelling of Signalling Protocols (QSIG) in H.323," 5 pages.

International Telecommunication Union. (Jul. 2001). "H.323 Annex M3: Tunnelling of DSS1 Through H.323," 10 pages.

International Telecommunication Union. (Jul. 2001). "H.323 Annex Q: Far-end Camera Control and H.281/H.224," 9 pages.

Johnson, J.T. (Aug. 1992). "Mix-and-Match Videoconferencing," *Data Communications*, pp. 73-74.

Lukacs, M.E. (Oct. 1994). "The Personal Presence System—Hardware Architecture," *ACM Multimedia '94 Proceedings*, San Francisco, CA, Oct. 15-20, 1994, pp. 69-76.

Microsoft Corporation. (Date Unknown). "NMR_901," located at <http://www.microsoft.com/windows/NetMeeting/Corp/reskit/images/NMR_901.GIF>, last visited Mar. 19, 2006, 1 page.

Microsoft Corporation. (Last updated Dec. 10, 1999). "Chapter 1: Installation Requirements and Setup," located at <http://www.microsoft.com/windows/NetMeeting/Corp/reskit/Chapter1/default.asp>, last visited Mar. 22, 2006, 8 pages.

Microsoft Corporation. (Last updated Dec. 10, 1999). "Chapter 2: Resource Kit Wizard," located at <http://www.microsoft.com/windows/NetMeeting/Corp/reskit/Chapter2/default.asp>, last visited Mar. 22, 2006, 15 pages.

Microsoft Corporation. (Last updated Dec. 10, 1999). "Chapter 4: Firewall Configuration," located at <http://www.microsoft.com/windows/NetMeeting/Corp/reskit/Chapter4/default.asp>, last visited Mar. 22, 2006, 6 pages.

Microsoft Corporation. (Last updated Dec. 10, 1999). "Chapter 7: Network Bandwidth Considerations," located at <http://www.microsoft.com/windows/NetMeeting/Corp/reskit/Chapter7/default.asp>, last visited Mar. 22, 2006, 43 pages.

Microsoft Corporation. (Last updated Dec. 10, 1999). "Chapter 8: NetMeeting Architecture," located at <http://www.microsoft.com/windows/NetMeeting/Corp/reskit/Chapter8/default.asp>, last visited Mar. 22, 2006, 4 pages.

Microsoft Corporation. (Last updated Dec. 10, 1999). "Chapter 9: Product Interoperability," located at <http://www.microsoft.com/windows/NetMeeting/Corp/reskit/Chapter9/default.asp>, last visited Mar. 22, 2006, 4 pages.

Microsoft Corporation. (Last updated Dec. 10, 1999). "Chapter 10: Understanding the T.120 Standard," located at <http://www.microsoft.com/windows/NetMeeting/Corp/reskit/Chapter10/default.asp>, last visited Mar. 22, 2006, 9 pages.

Microsoft Corporation. (Last updated Dec. 10, 1999). "Chapter 11: Understanding the H.323 Standard," located at <http://www.microsoft.com/windows/NetMeeting/Corp/reskit/Chapter11/default.asp#mcu>, last visited Mar. 19, 2006, 11 pages.

Microsoft Corporation. (Last updated Dec. 15, 1999). "Chapter 3: Finding People," located at <http://www.microsoft.com/windows/NetMeeting/Corp/reskit/Chapter3/default.asp>, last visited Mar. 22, 2006, 7 pages.

Microsoft Corporation. (Last updated Dec. 15, 1999). "Chapter 5: NetMeeting Security," located at <http://www.microsoft.com/windows/NetMeeting/Corp/reskit/Chapter5/default.asp>, last visited Mar. 22, 2006, 13 pages.

Microsoft Corporation. (Last updated Dec. 15, 1999). "Chapter 12: Conferencing Standards," located at <http://www.microsoft.com/windows/NetMeeting/Corp/reskit/Chapter12/default.asp>, last visited Mar. 22, 2006, 4 pages.

Microsoft Corporation. (Last updated Jan. 3, 2000). "Chapter 6: Using NetMeeting on Intranet Web Pages," located at <http://www.microsoft.com/windows/NetMeeting/Corp/reskit/Chapter6/default.asp>, last visited Mar. 22, 2006, 11 pages.

Niblett, P.D. et al. (Oct. 1, 1994). "Control of Video Telephony From a Data Conferencing System," *IBM Technical Disclosure Bulletin* 37(10):327-332.

Parnes, P. et al. (Jun. 1997). "mTunnel: A Multicast Tunneling System With a User Based Quality-of-Service Model," Interactive Distributed Multimedia Systems and Telecommunication Services, pp. 53-62.

Toga, J. (2000). "Introduction to H.323," PowerPoint Presentation, 10 pages.

VCON Ltd. (2001). "VCON Conferencing Systems, Meeting Point□Version 4.6 User's Guide," 213 pages.

White Pine Software, Inc. (Date Unknown). "MeetingPoint□ Conference Server," 19 pages.

Willebeek-Lemair, M.H. et al. (Oct. 1994). "On Multipoint Control Units for Videoconferencing," 19th Conference on Local Computer Networks Proceedings, Minneapolis, MN, Oct. 2-5, 1994, pp. 356-364.

\* cited by examiner

Recording          Playback

US 7,532,231 B2

VIDEO CONFERENCE RECORDER

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

This invention relates to a videoconference recorder. The invention is applicable for use to record video conference calls made through a multi-conference unit (MCU). It is also applicable for use in recording point-to-point (2-party) video calls without the use of an MCU. It is further applicable for use in recording presentations for later playback.

BACKGROUND TO THE INVENTION

With the growth of Video Conferencing, there has also been increased interest in recording such videoconferences. This may be done, for example, to allow people to refer back to what happened in a meeting, or, alternatively, a person may wish to view a conference that they have not taken part in or were not available for. It also allows a user to record a presentation which can then be viewed later as part of a videoconference.

Currently, as illustrated in FIG. 1, to record a videoconference on a Video Conference Recorder (VCR) 10 the Multi-Conference Unit 12 dials the VCR 10 as if it were an endpoint. The MCU 12 then proceeds to send the VCR 10 conference data over a data connection 14. The conference data is then stored by the VCR 10 in its memory 16. It should be noted that no data is sent from the VCR 10 to the MCU 12. The data is stored in the format in which it was sent to the VCR 10. For example, if the data is sent across the network 18 using the H.323 protocol standard as defined by the International Telecommunications Union then it will be stored in the data format dictated by this protocol.

FIG. 2 illustrates the network setup for playing back a videoconference which has been stored in the VCR's memory 16. In order to do this a user can dial directly into a VCR using a conventional video endpoint 20 such as an H.323 endpoint. The VCR 10 will then retrieve the data for that conference from the VCR's memory 16 and feed back the signal through connections 14 and 22 and communications network 18 to the endpoint 20 as if the VCR 10 itself were an endpoint. The VCR 10 does not process the video data in any way and only sends back the data in its original format.

There are significant disadvantages to recording video in this manner. Firstly, when video data is transmitted across the network it is sent in a compressed format using frames containing differences in information (also known as P-frames) and occasional keyframes (also known as I-frames). These frames may be divided up further into macroblocks. Each of these macroblocks can then either be an I-macroblock, containing all the information required for an image, or a P-macroblock, containing information regarding the differences between images. Frames are generally transmitted across the network as a combination of I-macroblocks and P-macroblocks In a live data stream transmission errors may be recovered by the endpoint sending a keyframe request to the data source resulting in the data source transmitting a keyframe. In video playback from a VCR 10, however, the keyframes and I-macroblocks are fixed within the stored data. Therefore, if a data packet is lost during transmission of the data from the VCR to the endpoint then there is no way for the VCR to reconstruct a keyframe in order to enable the endpoint to resynchronise to the data stream. This will cause the picture to be distorted for an extended period until all the picture elements (encoded as macroblocks) have been retransmitted as I-macroblocks. This results in degradation of the viewing experience at the endpoint.

A second disadvantage is that the VCR is only able to transmit the data in the format in which it is received. Therefore, a user is restricted to viewing recordings using a traditional video enabled endpoint such as an H.323 endpoint. However, a common means of viewing digital video is to use a "streaming player" program such as RealPlayer, QuickTime or Windows Media Player running on a streaming endpoint, for example, a standard personal computer 24. These programs have the capability to play real time video streaming formats but would not be able to view the data stream directly. In order to allow a user at a streaming endpoint to view the stored data a "transcoder" 26 is required to convert the data from the format in which it was originally recorded into one which the streaming endpoint 24 is able to process as illustrated in FIG. 2.

The transcoder 26 is an offline device which takes a file in its original format from the VCR's memory 16, converts it into the appropriate format, for example into a Windows Media Player version 9 (WM9) file, and then stores it back in the VCR's memory 16. The endpoint can then subsequently retrieve the transcoded copy from the VCR. This offline transcoding cannot start until the original recording is complete, and may only be able to transcode to one format at a time. Consequently users at streaming endpoints have to wait for their desired playback format to become available some time after the recording was made.

SUMMARY OF THE INVENTION

According to a first aspect of the invention there is provided a videoconference recorder (VCR) which is connectable to a communications network having at least one video enabled endpoint. The VCR includes an input for receiving data produced by the endpoint from the network, an input transcoder for converting the format of the data into an intermediate format, a memory for storing the converted data and an output for sending the stored data across the network to an endpoint. In this way the VCR can process the received data in order to allow the insertion of a regular stream of keyframes into the data when it is being stored. This allows the VCR to respond to keyframe requests from clients during playback.

Preferably the VCR also includes an output transcoder, such as a digital signal processor (DSP), for processing said converted data prior to sending said stored data across said network. The presence of the output transcoder allows the VCR to do a realtime conversion of the stored data into a format suitable for processing by an endpoint. The output transcoder also reacts to packet loss in the network by transmitting keyframes to the endpoint as required.

Preferably the VCR is configured to relay data between two endpoints connected to a network. This allows a video call between two users to be recorded directly without having to be routed via a multi-conference unit (MCU). By recording the video call directly there is far more flexibility as to the different views of the call which can be stored and played back. For example, during playback a viewer can choose to view each of the callers individually or both together.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described, by way of example, and with reference to the drawings in which.

DETAILED DESCRIPTION OF THE PREFERRED EMBODIMENTS

Figure 1:
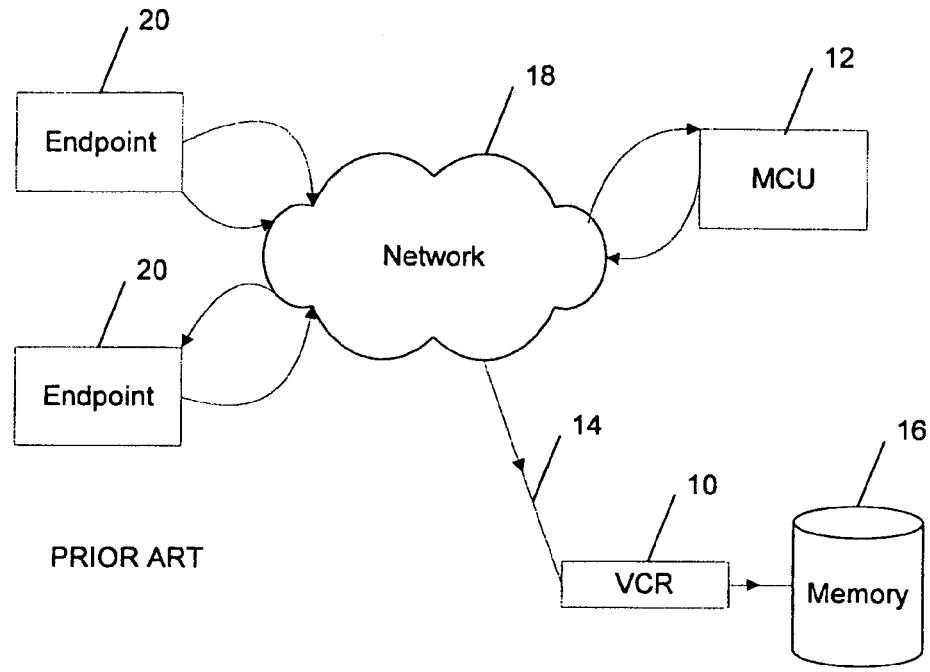
FIG. 1 illustrates a prior art VCR arrangement for recording a videoconference.
Figure 2:
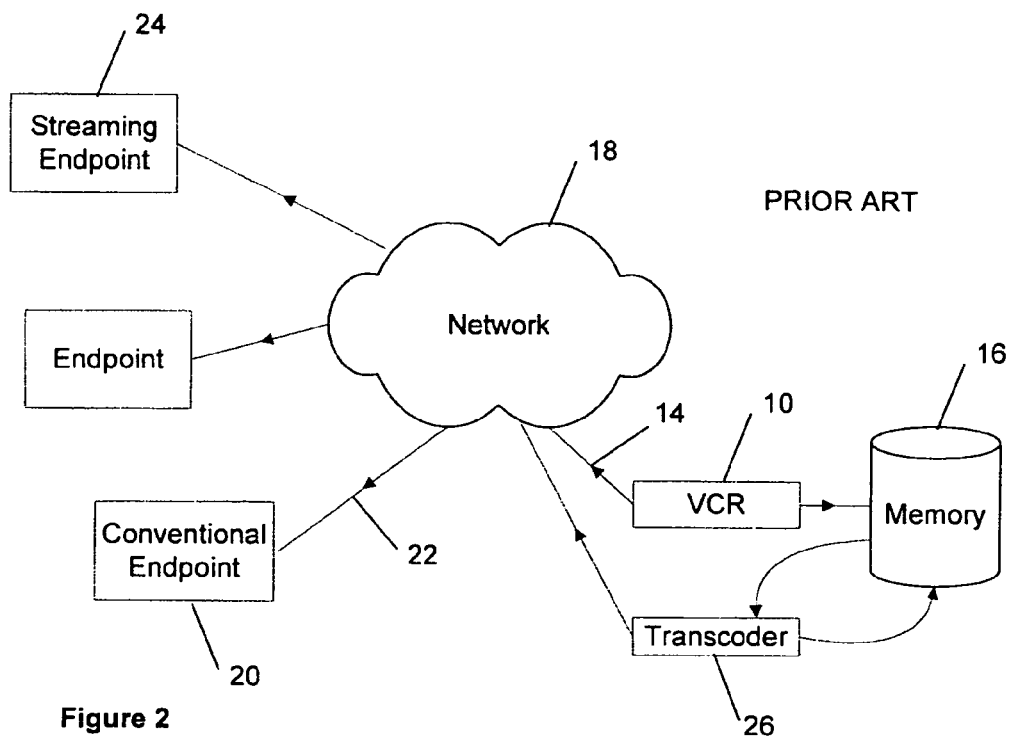
FIG. 2 illustrates a prior art VCR arrangement for playing back a videoconference.
Figure 3:
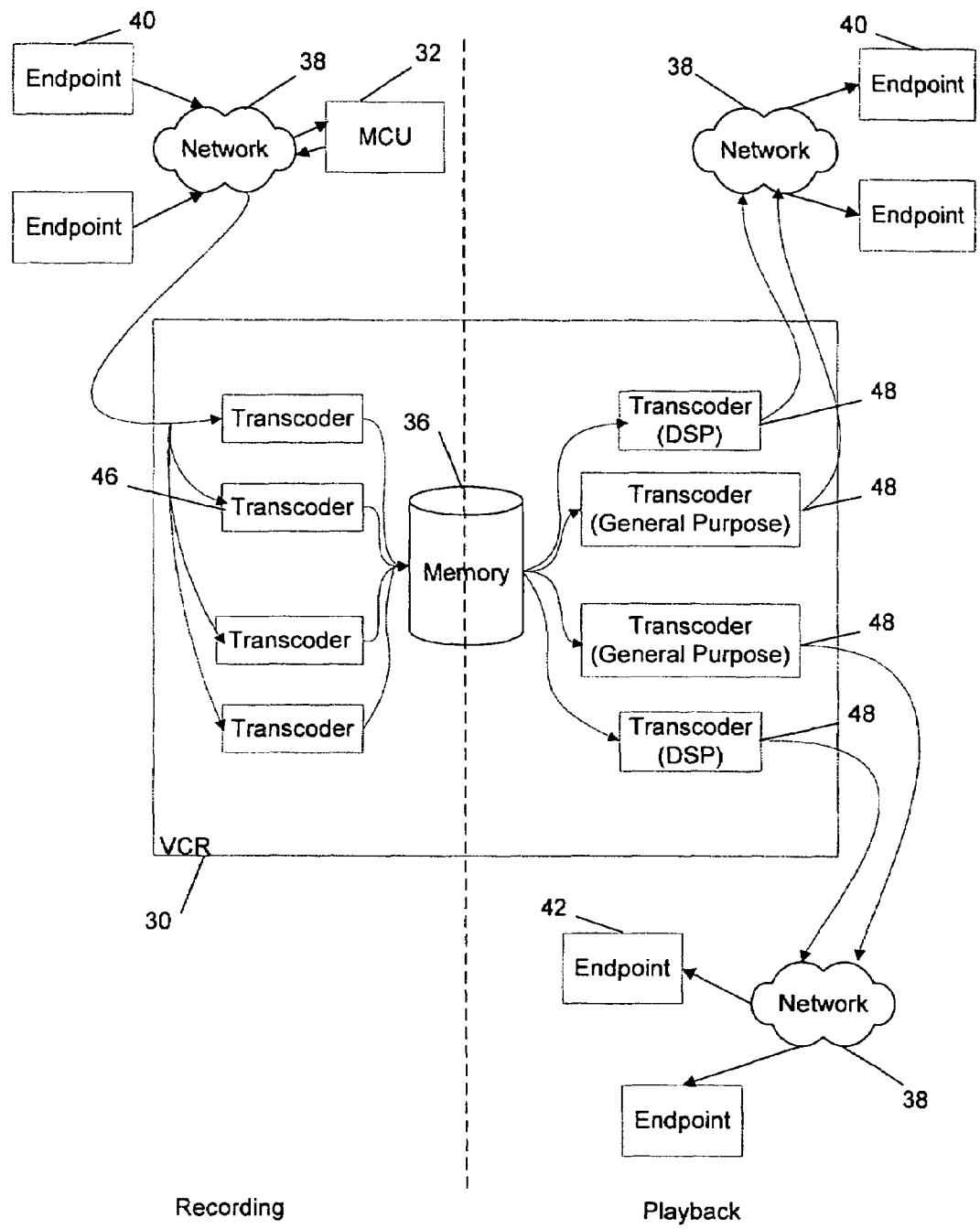
FIG. 3 illustrates a VCR in accordance with the present invention.

With reference to FIG. 3, the present invention provides a VCR 30 which has integral input transcoders 46, and output transcoders 48.

Recording a Video Conference

When a videoconference is to be recorded, the MCU 32 controlling the conference connects to the VCR 30 and sends it a data stream of the videoconference. The data is sent across the network using a protocol such as the H.320, H.323 or 3G standard defined by the International Telecommunications Union or the SIP standard defined by IETF MMUSIC (Multiparty Multimedia Session Control) working group.

Once received by the VCR 30 the data is sent through at least one input transcoder 46. At this transcoder the data is converted from the format in which it was sent across the network into a more suitable intermediate format. The intermediate format preferably has regular keyframes allowing a rapid response to keyframe requests. It also preferably is capable of being processed directly by endpoints, enabling the intermediate format to be played without transcoding and is easily transcoded into other formats in the event that an endpoint cannot play the intermediate format. The data which has been converted into the intermediate format is then stored in the VCR's memory which will typically be a high-speed hard disk or data array. Preferably, the data is stored at a high bit rate enabling a high quality image to be retrieved during playback.

Preferably, the intermediate format is Moving Picture Experts Group (MPEG-1). MPEG-1 is readily converted into other formats such as Windows Media 9 (WM9), QuickTime or Real at various bit rates and resolutions.

If multiple formats are to be stored by the VCR then it is preferable that the received data is passed to multiple input transcoders, each input transcoder converting the received data into a different format.

The input transcoder may also introduce more keyframes into the data from the conference. During the original transmission the data is typically sent across the network as a series of frames containing only differences from previous frames. Keyframes are typically only sent if there is loss of data in the network. By increasing the number of keyframes in the stored data, the transmitter can more readily respond to a keyframe request sent by the receiver when a packet of data is lost during later re-transmission across the network.

The transcoders 46 (and 48) may be hardware encoders and/or implemented using software executing on one or more digital signal processors (DSPs). Once converted by the transcoders the data is stored in the VCR's memory, 36. Preferably, the user setting up the video conference call is able to select formats, in addition to MPEG-1, in which the data is to be stored. Preferably, a default selection is provided.

Retrieving a Recorded Video Conference

When a user at an endpoint 40 wants to view a recorded videoconference that has been stored on the VCR 30, they will connect directly to the VCR 30 using the endpoint 40. The conference to be viewed can then be selected using control device, web based interface, or an FECC enabled device as described in our co-pending application filed on Oct. 12, 2004 and hereby incorporated by reference.

The conference to be viewed may be stored in a format which the endpoint can or cannot view directly. If the endpoint is a video enabled endpoint, for example an H.323 endpoint, it will commonly consist of a microphone, speaker, camera, display, processor, a device for user control input and a network connection to allow data to be passed to and from a communications network. A video enabled endpoint such as this cannot view the stored data, for example MPEG-1 formatted data directly, so the data is routed through an output transcoder 48 integral to the VCR 30. The output transcoder 48 is adapted to convert the data into a format which the endpoint 40 can process; in this case H.323 format. The output transcoder may be adapted to carry out this conversion either by virtue of its hardware configuration or using software being executed on it. The output transcoder may be a general-purpose processor or, alternatively, a DSP. It is the converted data format which is transmitted across the network 38 to the endpoint 40.

If, on the other hand the endpoint is a streaming endpoint 42, such as a personal computer having Windows Media Player and the data has been stored on the VCR's memory 36 in WM9 format at a suitable bandwidth, then there is no need for the data format to be converted any further. In this case the output transcoder 48 does not transcode the data but repackages the data into a stream appropriate for transmission across the network 38 and transmits it across the network 38 to the endpoint 42.

By transcoding the input data into multiple streaming formats at multiple bandwidths and storing them all, many streaming endpoints can be supported for playback simultaneously without the need for playback transcoding. By additionally storing the input data in a format such as MPEG-1, output transcoders can support video endpoints which may require video formatted in various formats such as H.261, H.263, H.264 and at various bandwidths including dynamically variable bandwidths, and at various resolutions and various frame rates.

By storing the data in a less compressed format, a larger number of keyframes may be present in the stored data or generated by the output transcoder 48 during re-transmission of the recording. This allows the output transcoder 48 to respond to keyframe requests by locating a keyframe that needs to be retransmitted and transmitting them across the network 38. This reduces the risk of impaired viewing of the recorded conference due to data loss.

Additionally, the presence of frequent keyframes in the stored data allows the playback devices to seek backwards or forwards through the recording at any desired speed.

The stored data may also be provided with markers allowing a user to skip between markers in the data without viewing the contents of the data between the markers.

Additionally, the structure of the present VCR, allows real-time playback of the recorded conference with time shifting. In the present invention as the data is transcoded while the data is being recorded and the output transcoder is a part of the VCR and not offline, it is possible for any part of the stored data to be retransmitted to a conventional or streaming endpoint using an output transcoder.

The use of transcoders which are integral to the VCR rather than offline transcoders also facilitates a number of users viewing the same videoconference. Each video endpoint (for example H.263) is allocated an output transcoder 48 which can take data from the memory and feed it to an endpoint using a format and bandwidth negotiated by that endpoint at playback time. As there are multiple output transcoders 48 and each output transcoder 48 is capable of supporting a separate video endpoint the number of users viewing a videoconference is only limited by the number of available transcoders. For a streaming endpoint, the appropriate format is stored in the memory when the conference was being recorded. Provided each streaming endpoint can process a stored format no transcoding resource is required, and multiple streaming endpoints can be supported with each streaming endpoint being used to view a recording from memory, asynchronously to each other.

In an alternative embodiment the MCU may be integral with the VCR. By having the MCU and VCR integral only one interface is required to access the functionality of both the MCU and the VCR. Additionally, no configuration of the interfaces between the VCR and MCU is required. This arrangement also facilitates the playing back of a recording into a conference.

Figure 4:
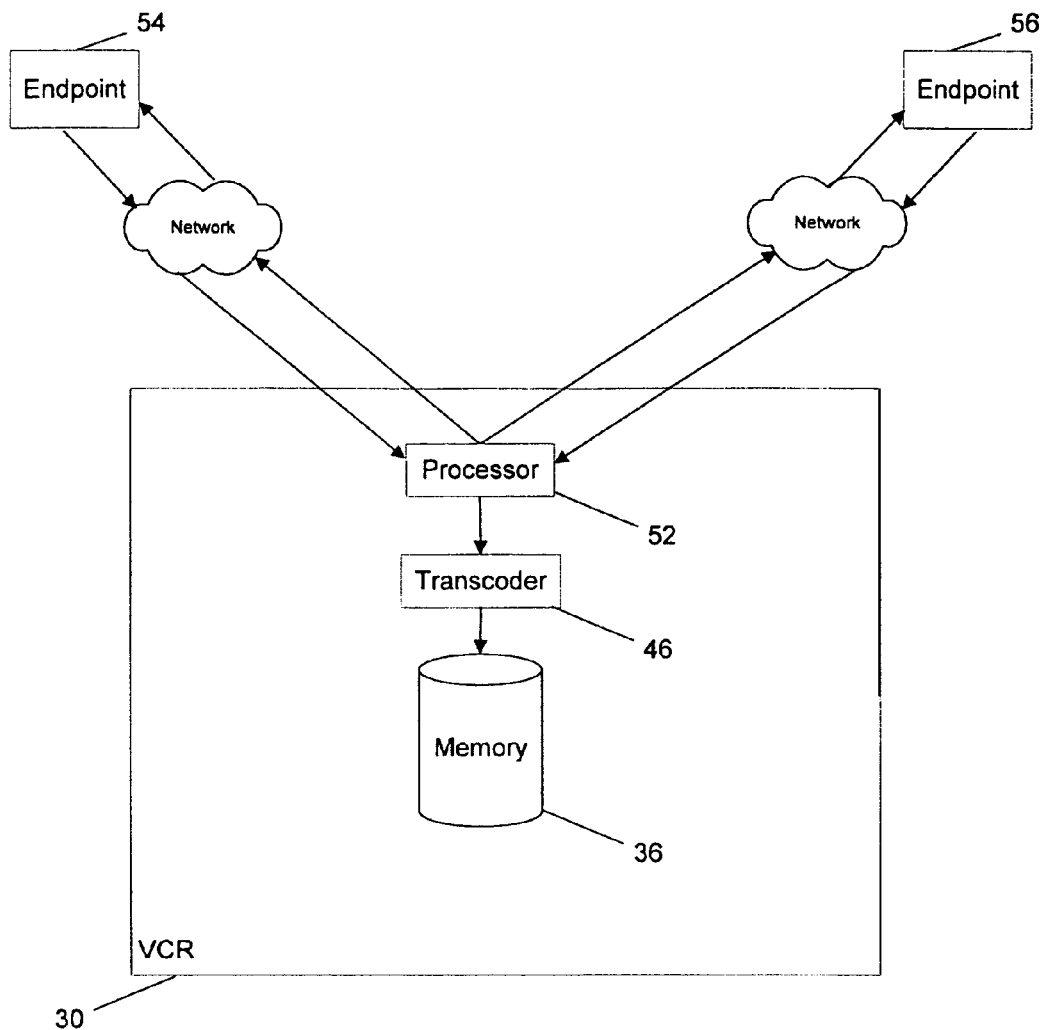
FIG. 4 illustrates a VCR arrangement for recording point-to-point video calls.

Additionally, the configuration of the VCR allows the recording of point-to-point video calls without the presence of an MCU as illustrated in FIG. 4. In this case the both endpoint 54 and endpoint 56 connect into the VCR 30 and communicate using the VCR 30. Preferably, a gatekeeper is programmed so that by dialling a special prefix the call from the originating endpoint is connected to the VCR. The VCR then calls out to the destination endpoint. During the call a processor 52 in the VCR 30 relays data between the two calling parties. At the same time as relaying the data between the parties the processor 52 makes an additional copy of the data and sends it to one or more input transcoders 46 for encoding into the format or formats in which it is to be stored. The encoded data is then sent to the VCR's memory 36 where it is stored. Recording data in this way has the additional advantage that different views can be stored and played back as desired. For example, a user may wish to view only the first participant, only the second participant or, alternatively, both together when playing back a call made in this way. In the prior art embodiment, configuration of both the MCU and the VCR is required in order to make a recording of this type, and only the one view composed by the MCU could be recorded.

A further advantage of the VCR of the present invention is that it is capable of acting as a recorder for video presentations. In this instance the user of a single endpoint dials directly into the VCR and records a presentation. In the prior art embodiment, configuration of both the MCU and the VCR is required in order to make a recording of this type.

The invention claimed is:

1. A video conference recorder connectable to a communications network having at least one video enabled endpoint comprising:
    an input configured to receive video data in an endpoint generated format produced by said endpoint from said network during a conference call;
    an input transcoder configured to convert a format of said video data into an intermediate format from the endpoint generated format received from said endpoint while the video data is being received, wherein the input transcoder causes video data in the intermediate format to include more keyframes than are in the video data in the endpoint generated format;
    a memory configured to store the video data in the intermediate format as stored data; and
    an output device configured to send said stored data across said network to an endpoint.

2. The video conference recorder as claimed in claim 1, wherein said output device includes an output transcoder configured to convert said stored data from the intermediate format into an output format for sending across said network.

3. The video conference recorder as claimed in claim 2, wherein said output transcoder is a digital signal processor.

4. The video conference recorder as claimed in claim 1, further comprising:
    an input device configured to receive signals from said endpoint; and
    a processor configured to receive said signals and to move through the keyframes in said stored data according to said signals.

5. The video conference recorder as claimed in claim 4, wherein said signals comprises one of fast forward, rewind, pause and skip.

6. The video conference recorder as claimed in claim 1, wherein said intermediate format includes keyframes dispersed within the stored data at a predetermined interval.

7. The video conference recorder as claimed in claim 1, wherein said intermediate format is one of MPEG-1, MPEG-2 and MPEG-4.

8. The video conference recorder as claimed in claim 1, further comprising a processor configured to relay data between two endpoints connected to said network.

9. The video conference recorder as claimed in claim 1, further comprising a processor configured to seek backwards through the stored data.

10. The video conference recorder as claimed in claim 1, further comprising a processor configured to seek forwards through the stored data.

11. The video conference recorder as claimed in claim 1, further comprising a processor configured to skip through the stored data.

12. A method of recording data sent across a communications network by a video enabled endpoint comprising the steps of:
    receiving video data in an endpoint generated format produced by said video enabled endpoint from said network during a conference call;
    converting a format of said video data into an intermediate format from the endpoint generated format received from said endpoint while the video data is being received, wherein said converting causes video data in the intermediate format to include more keyframes than are in the video data in the endpoint generated format; and
    storing said video data in the intermediate format.

13. The method of recording data as claimed in claim 12, wherein said receiving includes receiving video data formatted as one of H.320, H.323, 3G and SIP.

14. The method of recording data as claimed in claim 12, wherein said converting includes configuring the video data in the intermediate format to include keyframes dispersed in the video data in the intermediate format at a predetermined interval.

15. The method of recording data as claimed in claim 13, wherein said converting includes converting the video data in the endpoint generated format into one of MPEG-1, MPEG-2 and MPEG-4 as the intermediate format.

* * * * *